May 22, 1945.　　H. H. TALBOYS ET AL　　2,376,524
RAIL DRILL AND CHUCK THEREFOR
Filed Feb. 10, 1941　　9 Sheets-Sheet 3

May 22, 1945.   H. H. TALBOYS ET AL   2,376,524
RAIL DRILL AND CHUCK THEREFOR
Filed Feb. 10, 1941   9 Sheets-Sheet 5

Inventors
Henry H. Talboys
Helmer E. Erickson
by Parker Carter
Attorneys.

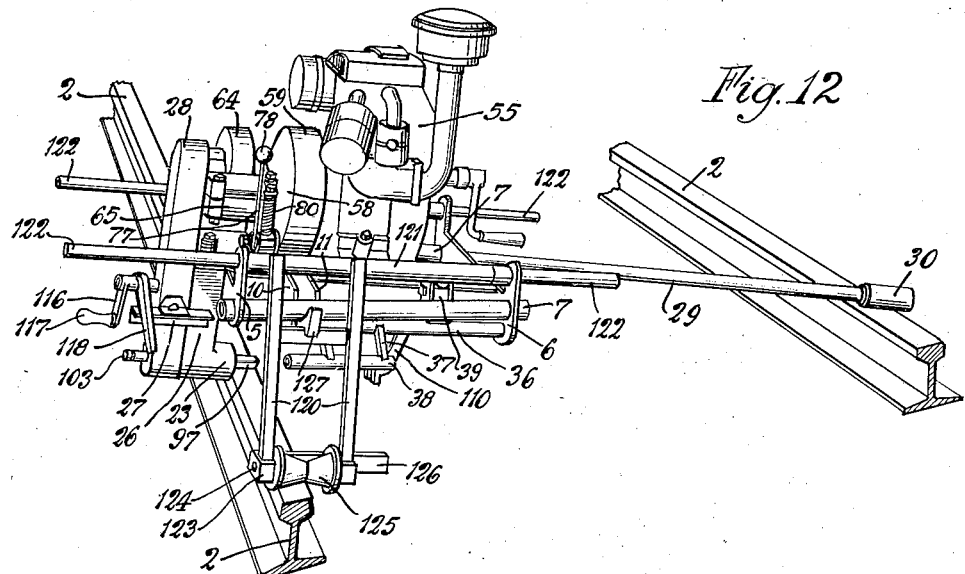
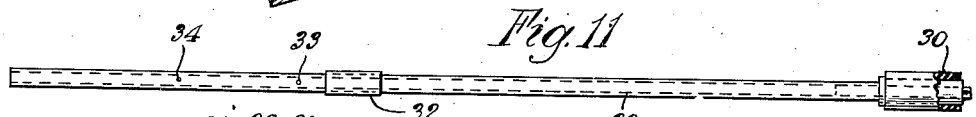
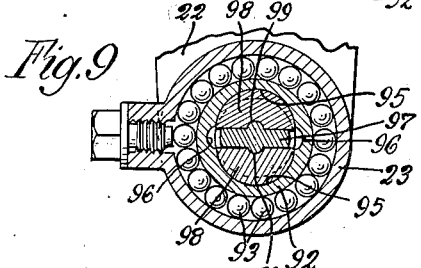
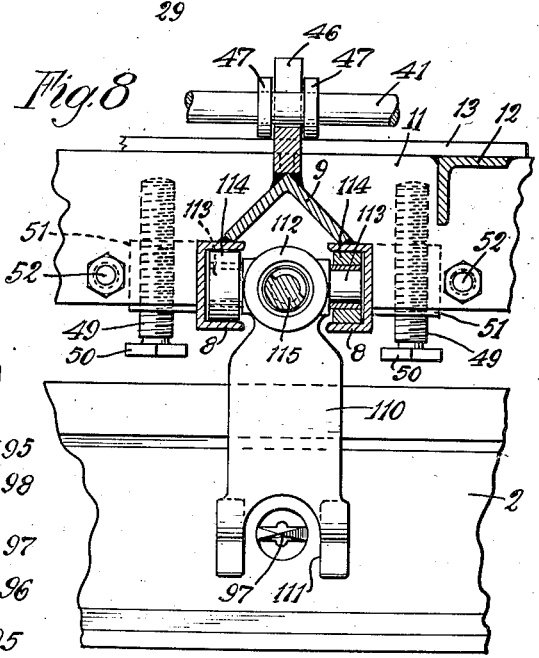
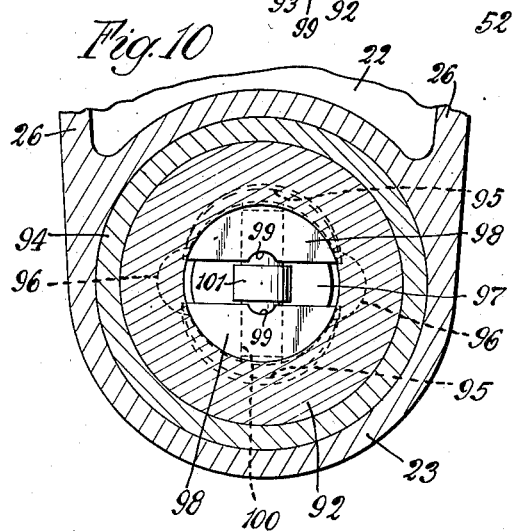

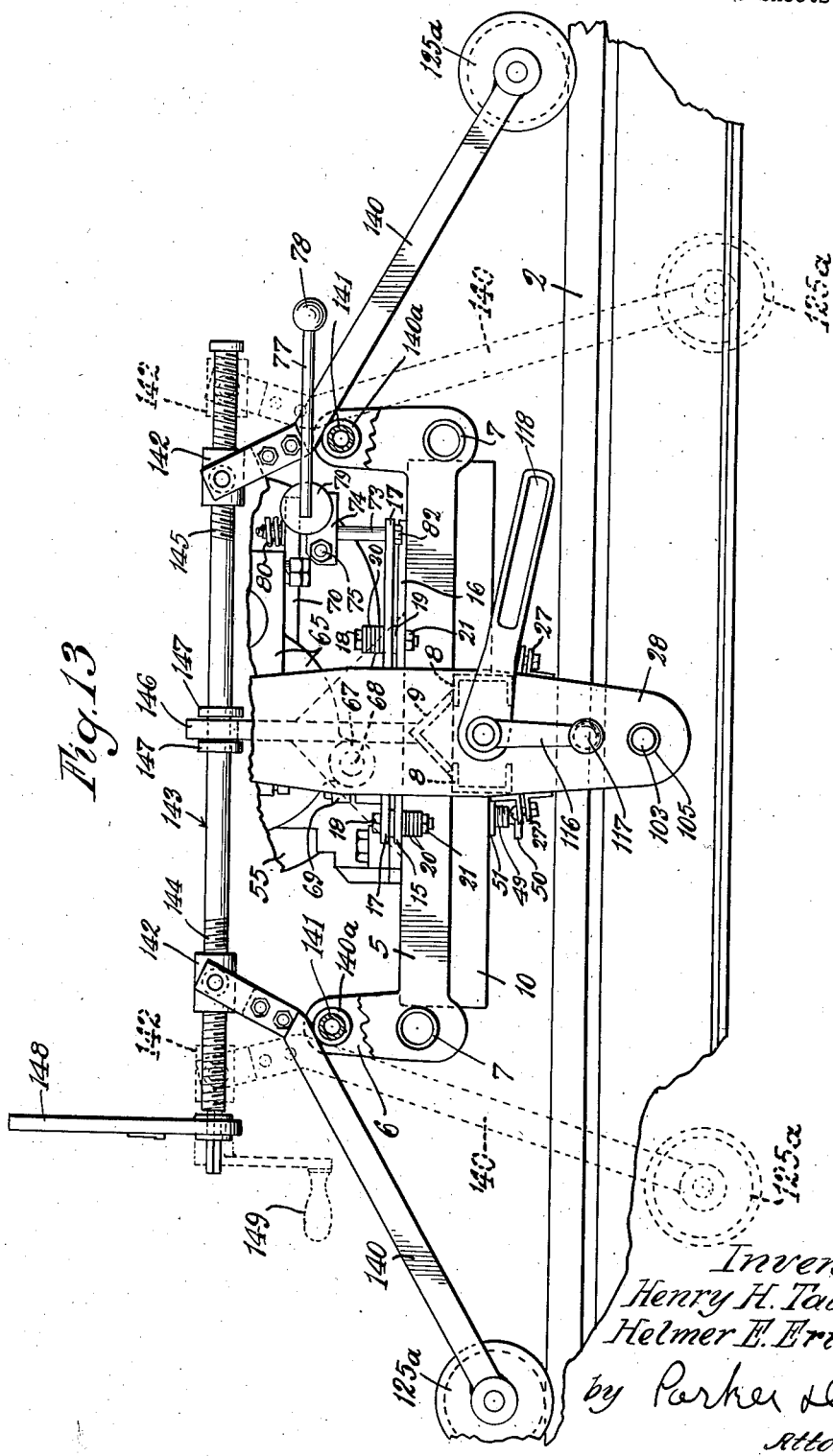

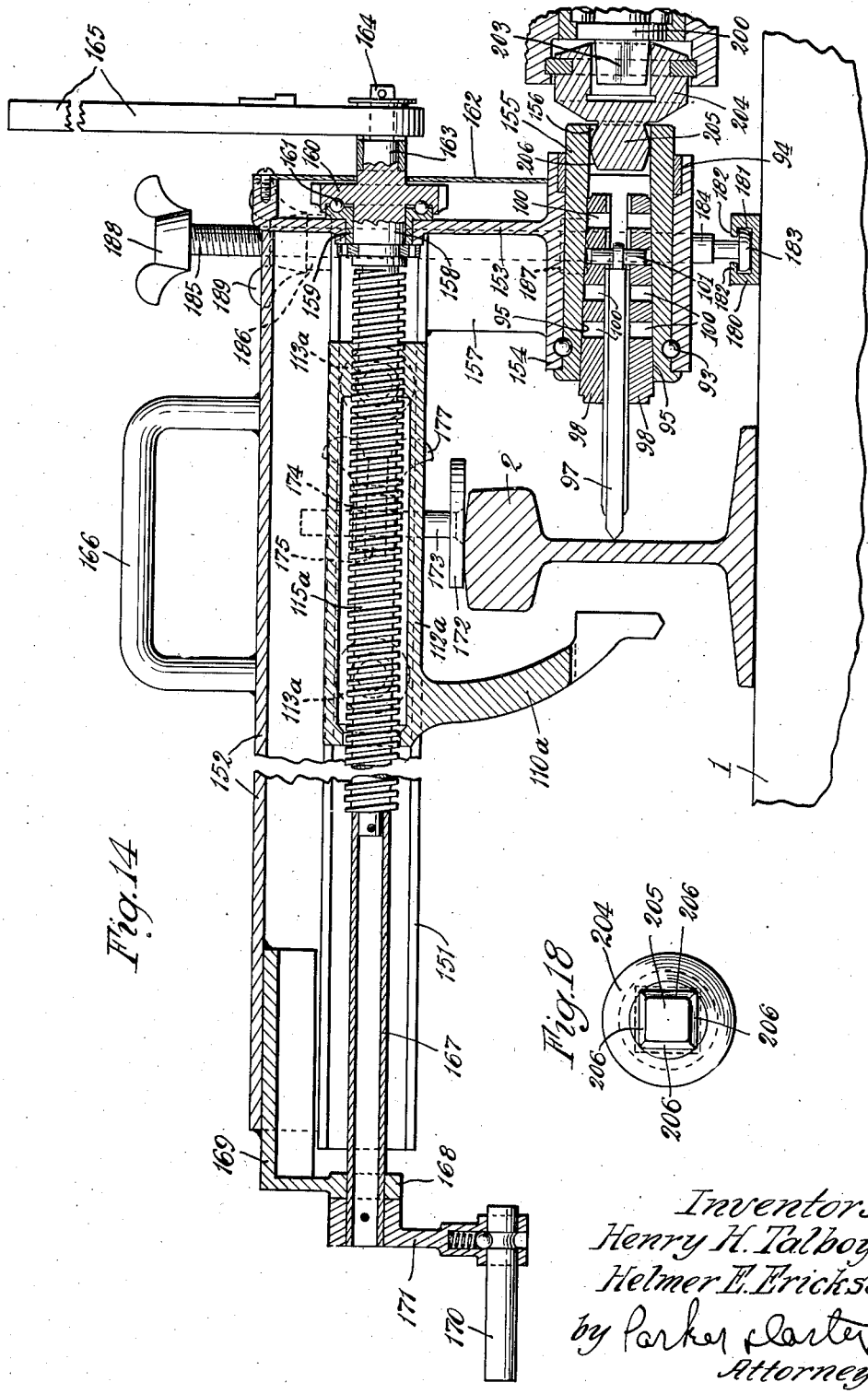

May 22, 1945.  H. H. TALBOYS ET AL  2,376,524
RAIL DRILL AND CHUCK THEREFOR
Filed Feb. 10, 1941   9 Sheets-Sheet 9
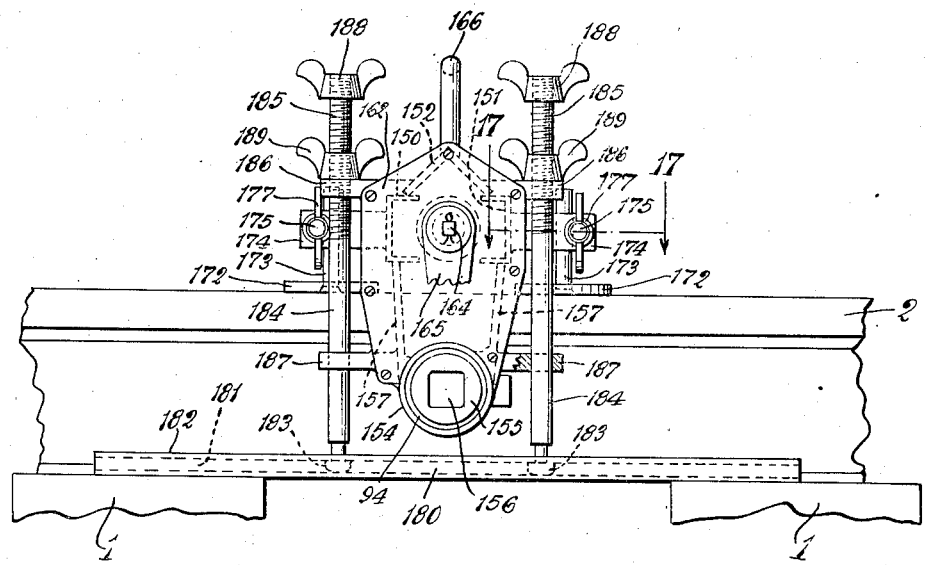
Fig.15
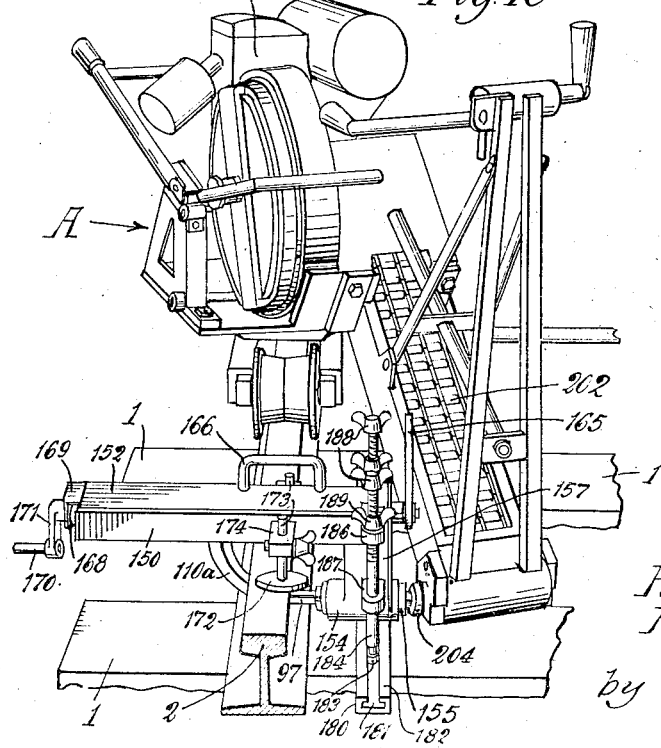
Fig.16
Fig.17
Inventors
Henry H. Talboys
Helmer E. Erickson
by Parker & Carter
Attorneys.

Patented May 22, 1945

2,376,524

UNITED STATES PATENT OFFICE 2,376,524

RAIL DRILL AND CHUCK THEREFOR

Henry H. Talboys and Helmer E. Erickson, Milwaukee, Wis., assignors to Nordberg Manufacturing Co., Milwaukee, Wis., a corporation of Wisconsin Application February 10, 1941, Serial No. 378,260

23 Claims. (Cl. 77—8)

Our invention relates to an improvement in rail drills and improved chucks therefor.

One purpose is the provision of an improved rail drill which may be employed, for example, in drilling holes in the rails of railway tracks.

Another purpose is the provision of improved feeding means for such a drill.

Another purpose is the provision of improved supporting means for such a drill.

Another purpose is the provision of improved means for lifting the drill to raised position for conveyance along the track.

Another purpose is the provision of improved drive means.

Another purpose is the provision of improved means for supporting the drill during its change from lowered drilling position to raised position for travel along the track.

Another purpose is the provision of improved means for maintaining the frictional drive of a rail drill or the like in effective and proper driving contact.

Another purpose is the provision of improved guiding means for a rail drill dog or stop.

Another purpose is the provision of an improved chuck and bit for rail drills and the like.

Another purpose is the provision of a rail drill which may be driven by other rail operating machinery, for example track wrenches, or the like, thus avoiding the necessity of having any separate power plant for the rail drill itself.

Other purposes will appear from time to time in the course of the specification and claims.

We illustrate our invention more or less diagrammatically in the accompanying drawings wherein:

Fig. 8 is a section on the line 8—8 of Fig. 3;

Fig. 9 is a section on an enlarged scale on the line 9—9 of Fig. 3;

Fig. 10 is a section on a still larger scale on the line 10—10 of Fig. 3;

Fig. 11 is a detail;

Fig. 12 is a perspective view illustrating the forward end of the device in raised position;

Fig. 13 is a side elevation similar to Fig. 2, illustrating a modified form;

Fig. 14 is a section through a variant form of the device;

Fig. 15 is an end elevation of the structure shown in Fig. 14, on a reduced scale;

Fig. 16 is a perspective view illustrating the operation of the device shown in Figs. 14 and 15;

Fig. 17 is an enlarged section taken on the line 17—17 of Fig. 15; and

Fig. 18 is an end view of a rail drill driving adaptor.

Like parts are indicated by like symbols throughout the specification and drawings.

Figure 1:
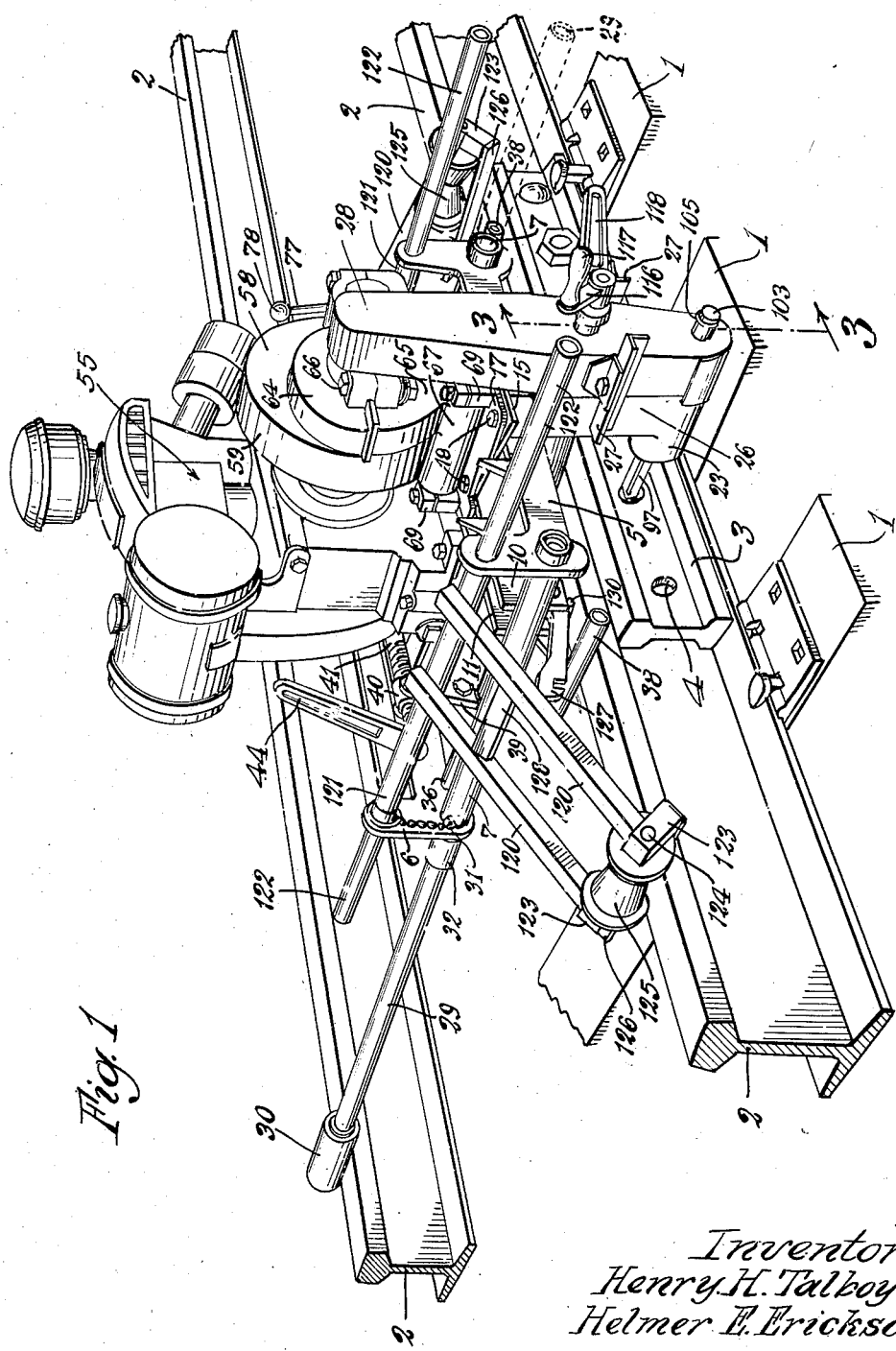
Fig. 1 is a perspective illustrating the drill in rail drilling position.

Referring to the drawings, the track ties are illustrated as at 1, carrying thereon any suitable rails 2. 3 indicates a fish plate having holes 4. The rail drill includes a frame structure including parallel side plates 5, 6, which may be connected, for example, by tubes 7 at each end and by channel members 8, 8, which also serve as guides for the dog or stop mechanism later described. These channels may also be connected by the inverted angle member 9, which may be welded to the upper flanges of the channels 8.

Extending between the tubes 7 are a pair of spaced parallel bars 10, 11, parallel with the side frame members 5, 6. They may, for example, be welded to the tubes 7. Extending between the bar 11 and the side frame member 6 are additional transverse supports or angles 12. Mounted upon the angles 12 are the longitudinally extending motor supporting bars 13, 14, the bar 14 resting also in part upon the support 11. Extending across the tops of the bar 10 and the side frame member 5 are two supporting bars or plates 15, 16. The members 15, 16 constitute a platform fixed in relation to the frame as a whole, upon which is mounted a transmission base plate 17, which may be secured as by bolts 18. 19 indicate washers welded upon the plates 15, 16, upon which the platform 17 actually rests. 20 are spacing shims or washers, which may be used later to raise the platform 17 in relation to the members 15, 16 when it is desired to raise the platform in relation to the frame, in order to take up stretch in the below described sprocket device. 21 are any suitable nuts which serve to hold the platform 17 in place and to confine the adjusting shims or washers 20.

Also welded to the side frame member 5 is the bearing assembly, including the flat portion 22, carrying at the bottom a horizontal transversely extending cylindrical sleeve 23 for carrying the chuck structure below described. It also carries a bearing sleeve 24, the purpose of which will later appear. Outwardly extending from the flat portion 22 are side webs or walls 26, which are joined at the lower ends to the sleeve 23. Outwardly extending at the opposite sides thereof are the angles 27, to which is secured a housing 28 for housing the below described chain drive.

It will be understood that the frame is roughly centered over one rail and may be supported in position on the track as by the outwardly extending supporting rod 29, which may at its outer end be provided with any suitable track engaging roller 30, suitably insulated or of insulating material. The rod 29 may be telescoped into one of the tubes 7, and may be held in adjusted position as by any suitable pin 31. It will be understood that the rod 29 is reversible, and as shown in dotted line in Fig. 1 may be inserted into the opposite end of the second tube 7. When it is in the full line position of Fig. 1, the drill is effective against the outer face of one of the rails. When it is inserted in the dotted line position, the frame may be centered over the opposite rail, and in that event it is effective for operation against the inner face of the rail. In other words, the device may be employed to drill against the outer or inner face of either one of the rails of the track. The bars 7 are slightly inclined, as will be clear in Fig. 1, which maintains the frame in the proper position for a direct horizontal drilling axis when the device is in the position in which it is shown in Fig. 1.

32 indicates any suitable stop for limiting the penetration of the bar 29 into the tube 7 to properly align the pin 31 with the mating aperture in the rod 29, such aperture being shown at 33 in Fig. 11. One or more additional apertures 34 may be provided, if desired, in order to permit an extension of the effective length of the rod 29.

Extending between the side frame member 6 and the intermediate support 11 at each end of the device are pivot rods 35, upon which are rotatable sleeves 36, carrying radial arms 37, the ends of which carry track engaging tubes 38. Each such sleeve has an upwardly extending arm 39, carrying a pivoted nut 40, in mesh with an actuating rod 41, having oppositely screw threaded portions 42 and 43. It will be understood that rotation of the rod 41 in one direction moves the arms 39 apart, and rotation in the opposite direction moves them together. The result is to raise or lower the frame in response to the contact of the members 38 against the rail top.

In order to rotate the rod 41 we provide any suitable means, for example a ratchet lever 44 on one end of the shaft 41. The shaft is centered and held against endwise movement, for example by a slotted ear 46, which may be welded to the angle member 9, as shown for example in Fig. 8, the shaft being provided with abutments 47 at each side of the member 46. It will be understood that the frame may be thus raised or lowered to position the drill center at the desired level in relation to the track upon which the device is being used.

We provide additional means for raising or lowering the frame, which may be employed, for example, when the drill is being used at the end of the rail, and when one of the members 38 may be out of contact with the rail end. We illustrate, for example, vertically axised screws 49, with track engaging heads 50, which are screw threaded into blocks 51, which may be secured between the members 10, 11. These screw threaded blocks are split, and in order to lock them we provide lock bolts 52 extending through the members 10, 11. The heads 50 may be made square or hex, in order to take a wrench for the adjustment of the screws 49.

55 indicates any suitable motor, the details of which form no part of the present invention. The motor is provided with a motor shaft 56, carrying a roller 57, secured by any suitable means to the shaft. The roller may, for example, be fibre. The roller abuts against the inner face of the drum flange 59, which forms part of the drum 58, having a hub 60 keyed to the driven shaft 61, provided with any suitable anti-frictional bearings 62, 63, mounted in a split housing unit 64, 65, the housing parts being bolted together by any suitable bolts 66.

Figure 5:
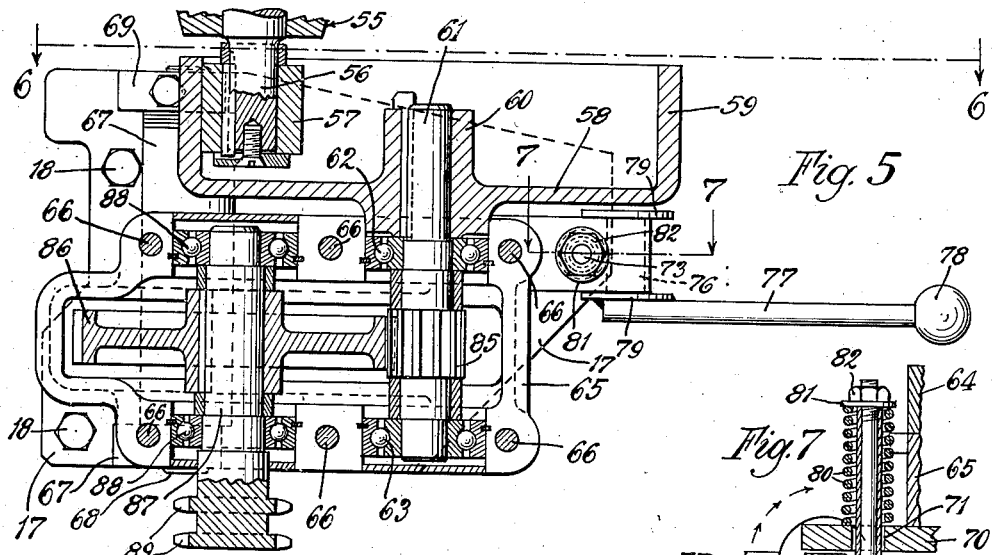
Fig. 5 is a section on an enlarged scale on the line 5—5 of Fig. 2.
Figure 6:
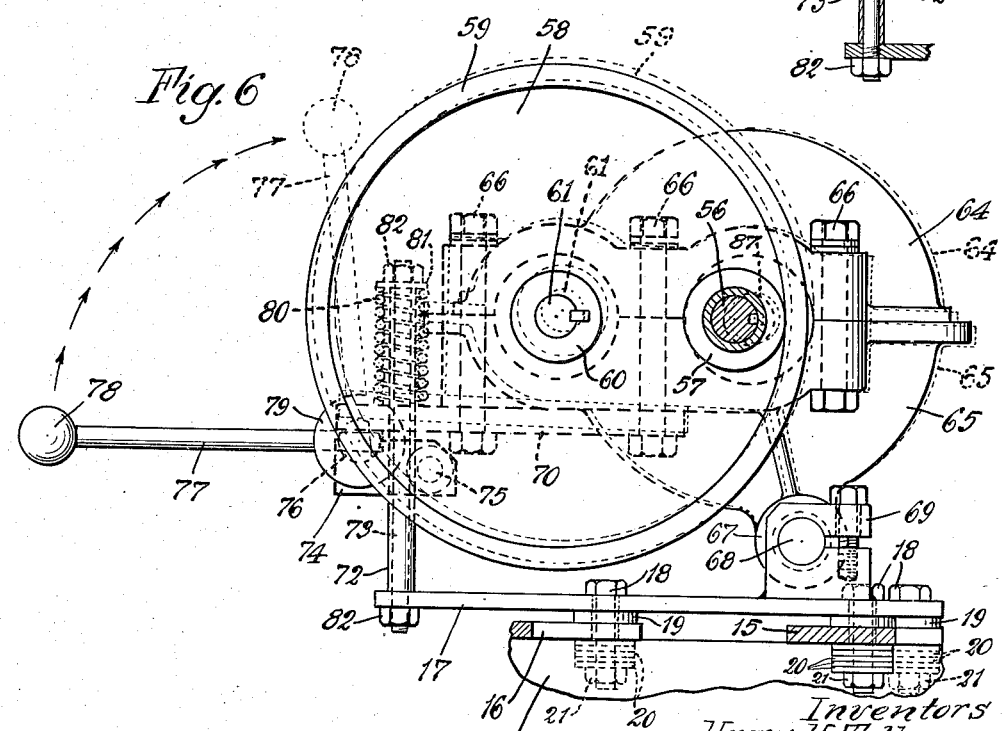
Fig. 6 is a section on the line 6—6 of Fig. 5.

The lower housing part 65 includes a sleeve 67, pivoted on a shaft 68, mounted in split blocks 69, which may be welded to the plate 17, as shown in Fig. 6. 70 is a bar secured by some of the bolts 66 to the bottom housing member 65, at one side thereof, as shown in Fig. 5. This bar is apertured as at 71 to permit the passage therethrough of a sleeve 72, through the hollow of which extends a bolt 73.

Clamped to the sleeve 72 is a split block 74, which may be secured by the bolt 75. The block is grooved to receive the flattened pin 76, which may be rotated by any suitable handle 77 at its terminal knob or ball 78. 79 indicate centering washers at each side of the flattened pin portion 76. When the parts are in the position of Fig. 7, the downward movement of the bar 70 is limited by the roller 57, restraining movement about the shaft 68. The bar 70 slightly clears the flattened portion of the pin 76. However, when the handle 77 is moved in the dotted line direction of Fig. 6, the rounded portion of the pin 76 engages and slightly lifts the bar 70 and moves the drum 59 out of driving contact with the roller 57.

Figure 7:
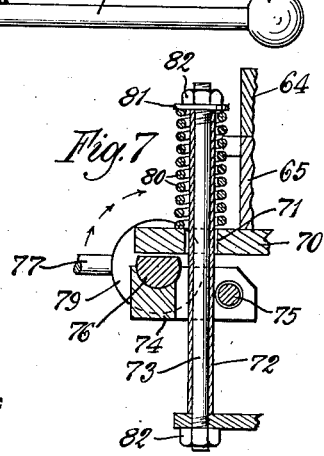
Fig. 7 is a section on the line 7—7 of Fig. 5.

The center bolt 73 is held in the position shown in Fig. 7, with the washer abutting against the top of the sleeve 72, as by any suitable nuts 82. The split housing 64, 65 may be raised by moving the handle 77 from the full line to the dotted line position of Fig. 6, which results in rotating the pin 76. In the raised position the rounded portion engages the bottom of the bar 70 and lifts it. It will be understood that, when the parts are in the full line position of Fig. 6, the roller 57 is in driving contact with the inner face of the drum flange 59, and the below described drill is then driven by the motor. When the handle is moved out to the dotted line position of Fig. 6, the transmission housing is slightly rotated about the shaft 68, and the result is to free the roller 57 from driving contact with the flange 59, thus interrupting the drive. The friction is governed by the spring 80, which is properly set as by the sleeve 72.

Mounted on or forming part of the shaft 61 is the pinion 85, which is in mesh with the gear 86 on the shaft 87, mounted in any suitable bearings 88 in the split housing 64, 65. The shaft 87 carries any suitable sprocket or sprockets 89, located exteriorly of the housing 64, 65, about which pass sprocket chains 90, which extend about sprockets 91 mounted on or formed integrally with the sleeve 92, rotatable in the sleeve 23. 93 indicate any suitable ball bearings for one end of the rotated sleeve 92, and 94 indicate any suitable bearing means for the opposite end of said sleeve.

The sleeve or chuck spindle 92 has a pair of tapered seats 95, each one of which is semi-circular in cross section at the outer end, converging to form a true circle, or its approximation, at the inner end. Separating these tapered seats are lateral enlargements which may be generally arcuate in cross section, shown for example at 96 in Figs. 9 and 10.

97 indicates a flat drill bit which is held between the chuck halves 98, the outer faces of which conform to the faces of the tapered seats 95 of the spindle 92. The chuck halves 98 are grooved as at 99 to hold the the drill 97 in proper alignment. They are also provided with a plurality of aligning holes 100, which may receive a limit pin 101, which serves to position the inner end of the bit 97. It will be understood that as the bit wears down the pin 101 may be advanced successively forwardly along the sequence of aligned holes 100. The chuck assembly is frictionally held in place by the seating of the chuck halves against the opposed tapered faces of the spindle 92.

As a ready means for kicking out the chuck we provide a kickout pin 103, having an enlarged head 104, within the cavity of the spindle 92, to limit its outward movement, and an exterior spring ring 105 to limit its inward penetration. It will be understood that when the drill is in use the pin 103 is not functioning, but a tap or push is sufficient to release the chuck by unseating the chuck halves 98, to permit the removal of the chuck for replacement or adjustment of the bit 97. The side enlargements 96 permit the employment of bits of a width greater than the diameter of the chuck halves, and of course a smaller bit can also be employed if desired.

In order to feed the drill we provide a dog 110, effective to engage a rail web on a side opposite the drill. It may be of any suitable form, and is provided with any suitable aperture 111 to permit the passage of the bit therethrough. The dog 110 is mounted on or forms part of the carriage 112, which has laterally extending pins 113, on which are mounted rollers 114, which ride within the channels 8. We illustrate two pairs of rollers 114, at each end of the carriage 112, as shown for example in Fig. 3. The carriage 112 is screw threaded upon the worm 115, and may be rotated, for example, by the exterior crank 116, with the handle 117. Any suitable ratchet 118 may be employed for final adjustment and for feeding the drill. It will be understood that the ratchet is reversible, the details not forming of themselves part of the present invention. The worm shaft as a whole is mounted in any suitable ball bearings 119 within the sleeve 24.

Figure 2:
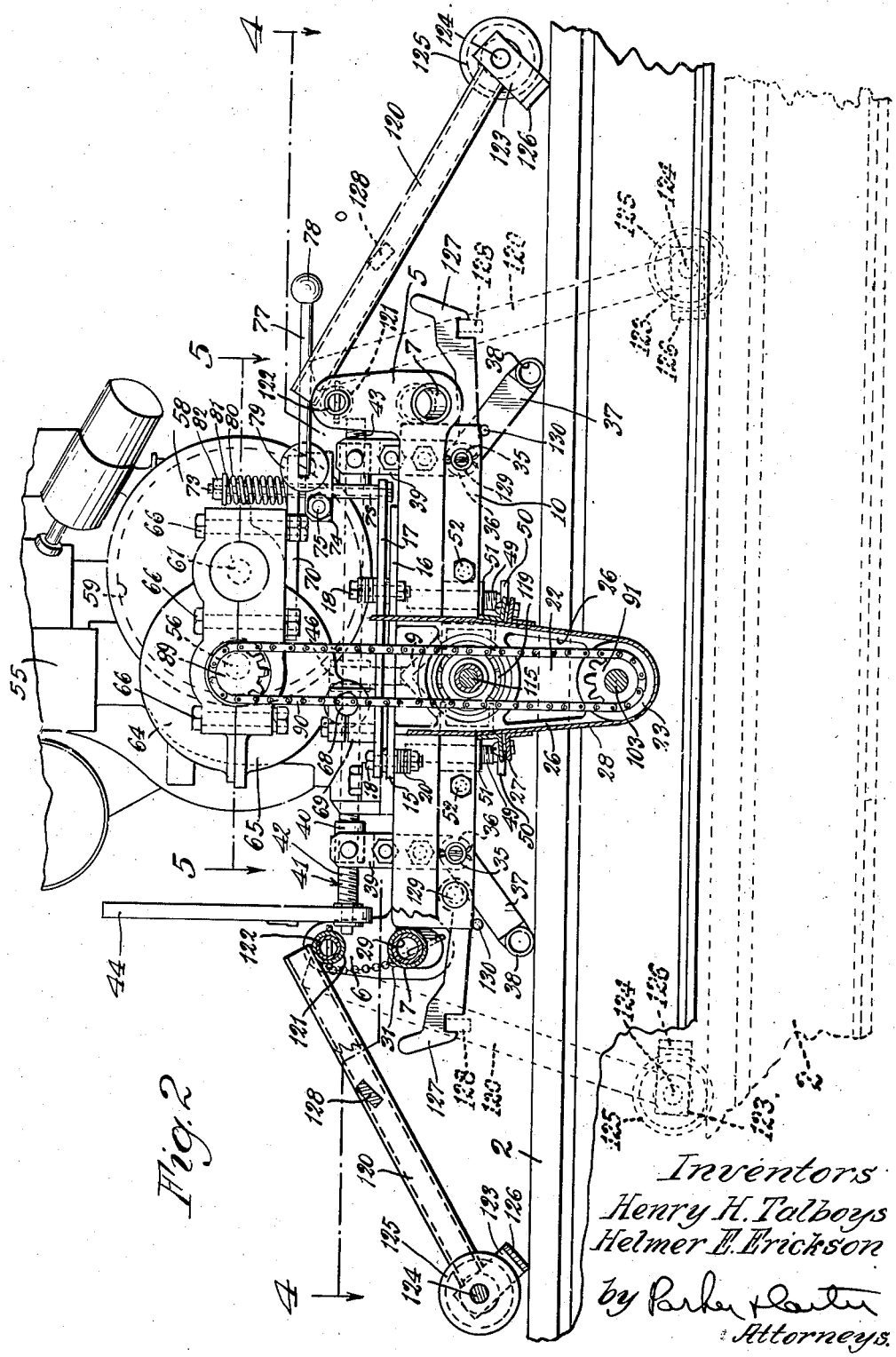
Fig. 2 is a side elevation, with parts broken away and parts in section, illustrating the drill in track operating position, and in dotted line in raised position.
Figure 3:
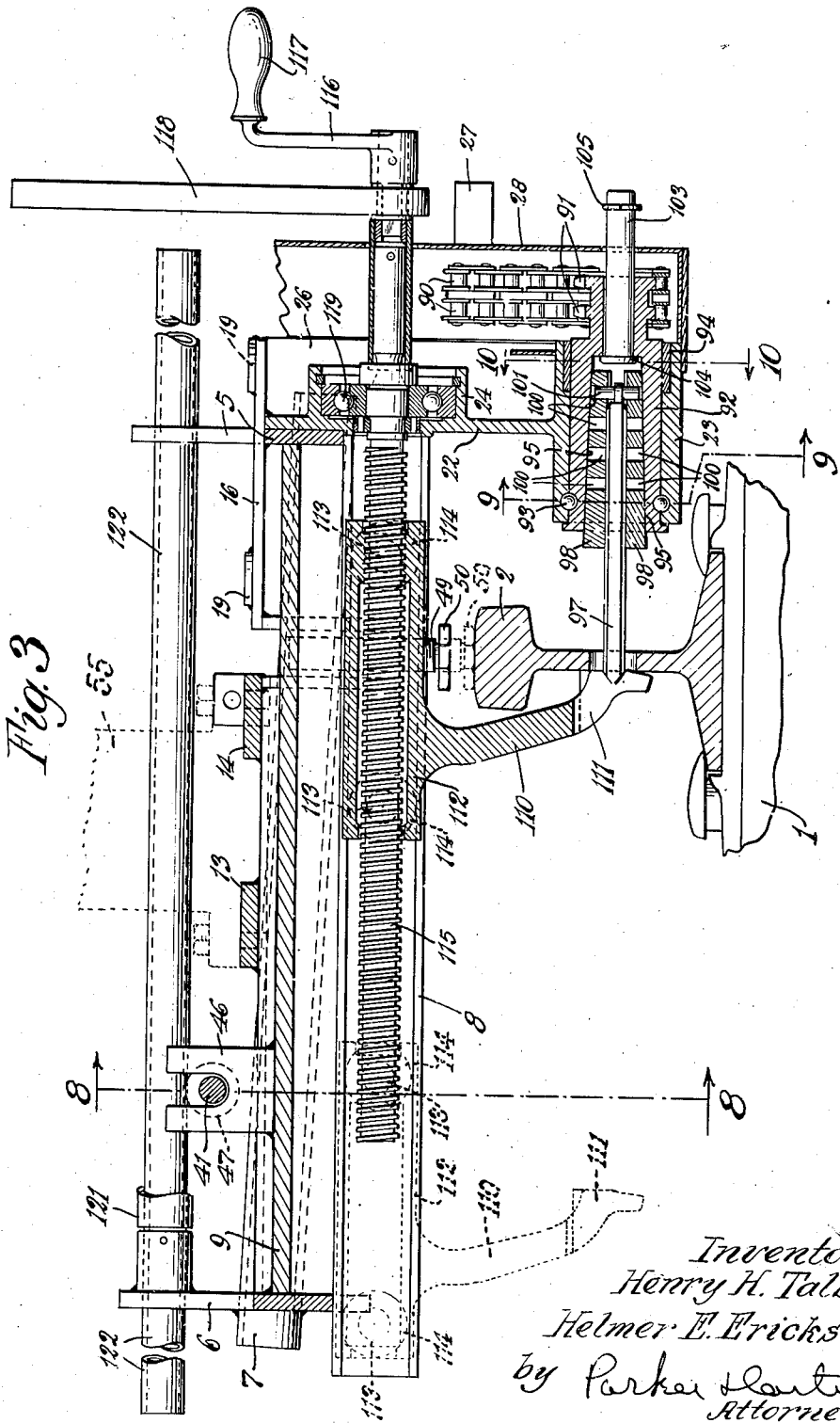
Fig. 3 is a section on an enlarged scale on the line 3—3 of Fig. 1.
Figure 4:
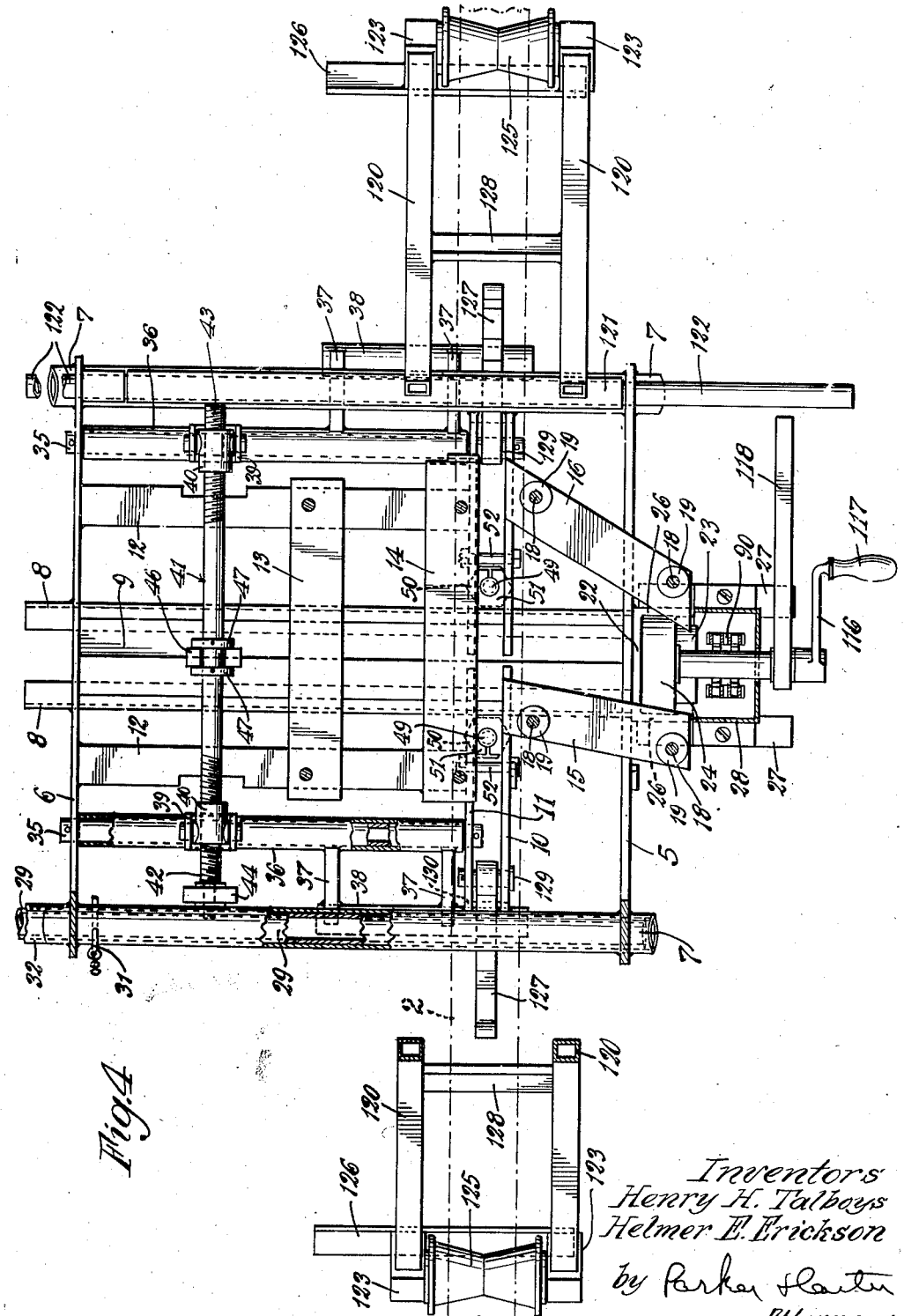
Fig. 4 is a section on the line 4—4 of Fig. 2.

In order to raise the frame from the track and permit it to roll along the track, we provide, as shown in Figs. 1, 2 and 3, a pair of arms 120, the upper ends of which may be secured to sleeves 121, rotatable on rods 122, passing between the side frame members 5, 6. At the lower ends the arms 120 are provided with blocks 123, which carry shafts 124, upon which are mounted track engaging rollers 125. Welded to these blocks are transversely extending bars 126, which extend outwardly, as shown for example in Fig. 4. During the operation of the device these arms 126 may rest upon the rail tops, as by that time the supporting arms perform no function. When it is desired to raise the frame, the frame is forwardly moved away from the rail in order to clear the bit from the top rail flange. Then the frame is lifted, and the arms 120 rotate downwardly to the dotted line position, as shown in Fig. 2, at which time the pawls 127 engage the abutments 128, which are shown as extending between the arms 120. The pawls are pivoted between the members 10, 11, as at 129. 130 are supporting pins for holding the pawls in proper alignment to engage the members 128.

As the frame is lifted, for example by means of the rods or handles 122, the outwardly extending members 126 engage the tops of the rail. After the frame has been lifted far enough so that the bit clears the top flange of the rail, then the frame may be moved laterally back into position over the rail, with the rollers 125 engaging the rail top. The device is then ready to be wheeled along the track. The extensions 126 are also effective to prevent the arms 120 from dropping down during the drilling operation, when the frame as a whole is bodily moved toward or away from the work, as the bit is advanced or retracted. For the same reason the bars 38 are of substantial length to permit a substantial transverse movement of the frame during the drilling operation as the frame and chuck are moved in unison as the drill is fed toward or away from the work.

Referring to the form of Fig. 13, we virtually combine the functions of the arms 37 and 120 in the arms 140, welded intermediate their ends to sleeves 140a, which are pivoted to the frame as at 141, and provided at their upper ends with pivoted nuts 142, in mesh with the actuating shaft 143, with its reverse threads 144, 145. The shaft 143 is supported and held against endwise movement by a slotted bracket 146, secured in any suitable manner to the frame structure, and abutments 147 are provided on the shaft 143 at each side of the bracket 146. The shaft may be rotated, for example, by means of a crank 149, shown in dotted lines, or a ratchet lever 148. The arms 140 carry at their lower ends structures similar to those illustrated in Figs. 1 and 2, including rollers 125a. The rollers 125a are of sufficient length to permit transverse sliding movement on the rail.

Referring to the form of Figs. 14 to 17, we illustrate the form of our drill, which may be employed for use with other track working equipment separately mounted or supported on the rails, or adjacent the rails, such as, for example, a track wrench, the details of which do not of themselves form part of the present invention. Therefore, in the variant form or attachment, a power plant is omitted from the drill proper, and the drill is directly driven by the rotation of the operating spindle of the track wrench.

Referring to the drawings, we illustrate a frame, consisting of two opposed channels 150, 151, which may be connected and spaced as by an inverted angle iron 152. These channels perform the same function as the channels 8 and the angle iron 9 of Fig. 3. They are further connected at their forward end by a plate 153, which carries at its lower end a spindle bearing 154, and in which rotates a drill spindle 155, the details of which are generally the same as the spindle 92 of Fig. 3. However, the spindle 155 has a square or non-circular aperture at its outer end, as at 156, to receive an actuating member, which will later be described.

The details of the chuck structure are the same and need not be separately described.

The plate 153 has side webs 157, which are secured to the lower flanges of the channels 150, 151. The parts are preferably welded together.

A worm 115a, corresponding to the worm 115 of Fig. 3, is provided with a bearing portion 158, rotating in a bearing sleeve 159, mounted on the plate 153. The portion 158 has an enlargement, as at 160, opposed to the bearings 161, on an outward extension of the sleeve 159. 162 is a closure plate, through which extends an end portion 163 of the worm, which has a squared portion 164 to receive any suitable ratchet member 165, whereby the worm may be rotated in either direction. The details of the ratchet do not of themselves form part of the present invention.

A lifting handle 166 may be welded or otherwise secured to the top of the device, as to inverted angle 152. A dog 110a, substantially the same as the dog 110 of Fig. 3, is mounted on or forms part of a carriage 112a, having rollers 113a, which ride in the channels 150, 151. The end of the worm opposite to the ratchet 165 is provided with a tubular extension 167, which extends outwardly beyond the ends of the channels 150, 151, and is received in a supporting bracket or bearing 168, a portion of which, 169, may be welded to the inverted channel 152. A handle 170 is connected by a crank 171 to the outer end of the worm extension 167.

The frame above described may be mounted for transverse sliding movement on the top of the rail 2, as by any suitable abutments 172, which are mounted at the lower ends of pins 173, which pass through lugs 174 secured to the outer faces of the channels 150, 151. The pins are adjustably secured in the lugs 174 by studs 175, which are grooved as at 176 to engage a portion of the pins 173. The studs 175 are screw threaded to receive wing nuts 177, as shown in Figs. 15 and 17.

As further means for supporting the drill structure in proper horizontal alignment, we provide a tie engaging channel 180, having an aperture 181, and overhanging top flanges 182, which may be either integral or secured to the channel. Slidably fitting in the space so formed are heads 183, from which extend screws 184 having screw threaded portions 185. The screws 184 are threaded into lugs 186, secured to the channels 150, 151 and angle member 152, and are further supported in lugs 187 at either side of the spindle bearing 154, as shown in Fig. 15. Handles or wing nuts 188 secured to the upper ends of the screws 184 facilitate rotation of said screws for adjustment, which, when properly adjusted, are locked in position by winged lock nuts 189.

In order to rotate the drill we may employ, for example, a track wrench of the general type shown in Patent No. 1,978,513, issued October 30, 1934, to Henry H. Talboys. As the details of the wrench do not form part of the present invention, it is generally indicated as "A" in Fig. 16.

It will be realized, however, that at the end of the wrench is a driven spindle 200, which may be driven from the track wrench power plant 201, as by the chain 202. The spindle 200 is shown as terminating in a square shaft 203, which penetrates a square aperture in an adaptor 204, which is rotatably mounted at the end of the track wrench arm in any suitable manner. It, in turn, has a squared head 205, tapered as at 206, and adapted for penetration into the square aperture 156 of the drill sleeve 155. It will be understood, therefore, that when the drill is properly adjusted in relation to the rail, with the dog 110a in proper position, the rotation of the shaft 203 and the adaptor 204 drives the drill and rotates the bit 97. The tapering of the squared head 205 of the adaptor permits variation or tilting between the axis of rotation of the drill bit 97, without any binding or disturbance.

It will be realized that, whereas we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

We claim:

1. In a transmission for rotary tools, a frame, and means for supporting it on a track, motor means on said frame, including a drive shaft and a drive roller thereon, and a transmission unit bodily movable as a whole in relation to said frame, said transmission unit including a hollow generally cylindrical drum having a flange adapted, when said transmission unit is in one position, to engage said drive roller, yielding means for urging said unit into roller contacting position, and means for moving it out of roller contacting position, including an abutment member on the transmission unit, a supporting member on the frame, a rotatable lifting member interposed between the two, and means for rotating it, the lifting member having a portion of maximum thickness adapted to receive and support the abutment member, with the drum out of driven contact with the roller, and a portion of minimum thickness adapted to receive and support the abutment, with the drum in contact with the roller.

2. In a rail drill, a frame and means for supporting it, a motor means on said frame including a drive shaft, with a drive roller thereon, a transmission assembly mounted for movement as a unit in relation to said frame and including a drill spindle, a driven shaft, a driving connection between said driven shaft and drill spindle, a driving drum, and a driving connection between said driving drum and driven shaft, said driving drum having a flange adapted to engage said roller, means for yieldingly urging said unit as a whole into a predetermined driving position in which the drum flange engages said roller, and means for readily moving said transmission unit as a whole to a position in which the drum flange is out of driving contact with said roller.

3. In a rail drill, a frame, and means for supporting it, a motor means on said frame including a drive shaft and a drive member thereon, a transmission assembly mounted for movement as a unit in relation to said frame and including a drill spindle, a driven member, and a driving connection between said driven member and said drill spindle, means for yieldingly urging said unit as a whole into a predetermined driving position in which the driven member is in driven relationship with the drive member of the motor, and means for readily moving said transmission unit as a whole to a position in which the driven member is out of driving connection with said drive member.

4. In a rail drill, a frame, and means for supporting it, a motor means on said frame including a drive shaft and a drive member thereon, a transmission assembly mounted for movement as a unit in relation to said frame, a driven member, and a driving connection between said driven member and said drill spindle, means for yieldingly urging said unit as a whole into a predetermined driving position in which the driven member is in driven relationship with the drive member of the motor, and means for readily moving said transmission unit as a whole to a position in which the driven member is out of driving connection with said drive member, including an abutment member on said assembly, a supporting member on the frame, a rotatable lifting member interposed between the two, and means for rotating it, the lifting member having a portion of minimum thickness adapted to receive and support the abutment member, with the driven member in driven contact with the driving member, and a portion of maximum thickness adapted to receive and support the abutment member, with the driven member out of driving contact with the driving member.

5. In a rail drill, a frame and means for adjustably supporting it on a rail, including a pair of levers oppositely and outwardly extending from transverse pivots longitudinally spaced along said frame, each said lever having a transversely extending and generally horizontal portion adapted to engage the top of the rail in slidable relationship, an actuating worm rotatably mounted on said frame and fixed against longitudinal movement thereon, said worm lying in general parallelism with the rail and having at each end worm threads of opposite pitch, and a nut member associated with each said lever and in screw threaded relationship with one of said threaded portions, and means for rotating said worm and for thereby unitarily moving said levers simultaneously toward or away from each other and for thereby raising or lowering said frame.

6. In a rail drill, a frame, means for supporting it on a rail in operating position, and additional means for supporting it on the rail in raised position, including a pair of levers oppositely and outwardly extending from transverse pivots longitudinally spaced along said frame, each said lever having at the outer end thereof a rail engaging roller, and means for holding said levers in frame raising position, including pawls interposed between said levers and said frame.

7. In a rail drill, a frame, means for supporting it on a rail in operating position, and additional means for supporting it on the rail in raised position, including a pair of levers oppositely and outwardly extending from transverse pivots longitudinally spaced along said frame, each said lever having at the outer end thereof a rail engaging roller, a transversely extending abutment member of greater length than the roller and lying in parallelism with the axis of the roller, adapted for slidable engagement with the top of the rail when the roller is out of supporting engagement with the rail.

8. In a rail drill, a frame and means for supporting it on a rail, a drill spindle rotatably mounted on said frame and held against longitudinal movement along its axis in relation to said frame, a drill bit in said spindle, means for rotating said spindle and bit, a rail engaging dog mounted on said frame and including a portion adapted to engage the side of the rail web opposite to the spindle, and means for bodily moving the frame and spindle in relation to said dog and for thereby feeding the drill bit toward and through the rail, said means including a worm rotatably mounted on said frame and held against longitudinal movement in relation thereto along its axis, and means for rotating said worm, and a carrier for said dog, including a portion in mesh with said worm.

9. In a rail drill, a frame and means for supporting it on a rail, a drill spindle rotatably mounted on said frame and held against longitudinal movement along its axis in relation to said frame, a drill bit in said spindle, means for rotating said spindle and bit, a rail engaging dog mounted on said frame and including a portion adapted to engage the side of the rail web opposite to the spindle, and means for bodily moving the frame and spindle in relation to said dog and for thereby feeding the drill bit toward and through the rail, said means including a worm rotatably mounted on said frame and held against longitudinal movement in relation thereto along its axis, means for rotating said worm, a carrier for said dog, including a portion in mesh with said worm, and guiding means for said carrier, including a pair of laterally spaced tracks and rollers at opposite sides of said carrier in guiding relationship with said tracks.

10. In a rail drill, a frame and means for slidably and adjustably supporting it on a rail, including a plurality of supporting elements mounted for movement on said frame, and means for raising and lowering them in relation to said frame, each such support including an abutment member slidable on the top of the rail, a drill spindle rotatably mounted on said frame and means for holding it against longitudinal movement along its axis in relation to said frame, a drill bit in said spindle, means for rotating said spindle and bit, a rail engaging dog mounted on said frame and including a portion adapted to engage the side of the rail web opposite the spindle, and means for bodily moving the frame and spindle in relation to said dog, with said abutments sliding transversely across the rail, and for thereby feeding the drill bit toward and through the rail.

11. In a rail drill, a frame and means for slidably supporting it on a rail for transverse sliding movement across said rail, a drill spindle rotatably mounted on said frame and held against longitudinal movement along its axis in relation to said frame, a drill bit in said spindle and means for rotating spindle and bit, guide means on said frame, a carrier member longitudinally movable along said guide means, a dog on said guide means adapted for engagement with the side of the rail web opposite the spindle, and means for bodily moving the frame and spindle in relation to said dog, and for thereby feeding the drill bit toward and through the rail.

12. In a rail drill, a frame and means for slidably supporting it on a rail for transverse sliding movement across said rail, a drill spindle rotatably mounted on said frame and held against longitudinal movement along its axis in relation to said frame, a drill bit in said spindle and means for rotating spindle and bit, guide means on said frame, including a pair of parallel tracks, a carrier member longitudinally movable along said tracks and having a plurality of rollers at each side thereof engaging said tracks, a dog on said guide means adapted for engagement with the side of the rail web opposite the spindle, and means for bodily moving frame and spindle in relation to said dog, and for thereby feeding the drill bit toward and through the rail.

13. In a rail drill, a frame and means for slidably supporting it on a rail for transverse sliding movement across said rail, a drill spindle rotatably mounted on said frame and held against longitudinal movement along its axis in relation to said frame, a drill bit in said spindle and means for rotating spindle and bit, guide means on said frame, including a pair of parallel tracks, a carrier member longitudinally movable along said tracks and having a plurality of rollers at each side thereof engaging said tracks, a dog on said guide means adapted for engagement with the side of the rail web opposite the spindle, and means for bodily moving frame and spindle in relation to said dog, and for thereby feeding the drill bit toward and through the rail, including a worm rotatably mounted on the frame and held against longitudinal movement in relation to said frame along its axis, said carrier member being in screw threaded relationship with said dog.

14. In a rail drill, a frame and means for slidably supporting it on a rail for transverse sliding movement across said rail, a drill spindle rotatably mounted on said frame and held against longitudinal movement along its axis in relation to said frame, a drill bit in said spindle and means for rotating spindle and bit, guide means on said frame, including a pair of parallel tracks, a carrier member longitudinally movable along said tracks and having a plurality of rollers at each side thereof engaging said tracks, a dog on said guide means adapted for engagement with the side of the rail web opposite the spindle, and means for bodily moving frame and spindle in relation to said dog, and for thereby feeding the drill bit toward and through the rail, including a worm rotatably mounted on the frame and held against longitudinal movement in relation to said frame along its axis, said carrier member being in screw threaded relationship with said dog, said worm being located between said tracks and at the general level of said tracks.

15. In a rail drill, a frame and means for supporting it on a rail, motor means on said frame, a drill spindle rotatably mounted on said frame and held against longitudinal movement in relation to said frame, a driving connection between said spindle and said motor means, and supporting means extending from said frame to the opposite rail of the track, said supporting means including a bar in telescopic relationship with the frame and having a rail contacting abutment at its outer end, and selective mounting means for said bar on said frame, adapted to support said bar selectively, extending outwardly from said frame at opposite sides of the frame.

16. In a rail drill, a frame and means for supporting it on a rail, motor means on said frame, a drill spindle rotatably mounted on said frame and held against longitudinal movement in relation to said frame, a driving connection between said spindle and said motor means, and supporting means extending from said frame to the opposite rail of the track, said supporting means including a bar in telescopic relationship with the frame and having a rail contacting abutment at its outer end, and selective mounting means for said bar on said frame, adapted to support said bar selectively, extending outwardly from said frame at opposite sides of the frame, including sockets on said frame having bar receiving openings at opposite sides thereof.

17. In a rail drill, a frame and means for supporting it on a rail for transverse movement across said rail, a drill spindle mounted on said frame and fixed against longitudinal movement in relation to said frame, a dog movably mounted on said frame and adapted to be opposed to the side of the rail web opposite said spindle, and means for moving said dog in relation to said frame and for thereby bodily moving said frame and spindle across said rail and thereby feeding the drill toward the face of the rail web opposite the dog, and a connector member interpenetrating with said spindle, adapted for driving connection with a power plant separate from said frame.

18. In a rail drill, a frame and means for supporting it on a rail for transverse movement across said rail, means for vertically adjusting said frame in relation to said rail, a drill spindle mounted on said frame and fixed against longitudinal movement in relation to said frame, a dog movably mounted on said frame and adapted to be opposed to the side of the rail web opposite said spindle, and means for moving said dog in relation to said frame and for thereby bodily moving said frame and spindle across said rail and thereby feeding the drill toward the face of the rail web opposite the dog, and a connector member interpenetrating with said spindle, adapted for driving connection with a power plant separate from said frame.

19. In a rail drill, a frame and means for supporting it on a rail for transverse movement across said rail, a drill spindle mounted on said frame and fixed against longitudinal movement in relation to said frame, a dog movably mounted on said frame and adapted to be opposed to the side of the rail web opposite said spindle, and means for moving said dog in relation to said frame and for thereby bodily moving said frame and spindle across said rail and thereby feeding the drill toward the face of the rail web opposite the dog, and a connector member interpenetrating with said spindle, adapted for driving connection with a power plant separate from said frame, said connector member being held against rotation in relation to said spindle but being tiltable in relation thereto.

20. In a rail drill, a frame and means for supporting it on a rail for transverse movement across said rail, a drill spindle mounted on said frame and fixed against longitudinal movement in relation to said frame, a dog movably mounted on said frame and adapted to be opposed to the side of the rail web opposite said spindle, and means for moving said dog in relation to said frame and for thereby bodily moving said frame and spindle across the rail and thereby feeding the drill toward the face of the rail web opposite the dog, and a connector member rotatable in unison with said spindle, said spindle and connector member having interpenetrating parts adapted to permit said connector member to tilt in relation to the spindle.

21. In a rail drill, a frame, means for supporting it on a rail in operating position, and additional means for supporting it on the rail in raised position, including a pair of levers oppositely and outwardly extending from transverse pivots longitudinally spaced along said frame, each said lever having at the outer end thereof a rail engaging roller, means for holding said levers in frame raising position, and additional rail engaging means at the outer ends of said levers having a transverse extension greater than the length of said rail engaging rollers.

22. In a rail drill, a frame, means for supporting it on a rail in operating position, and additional means for supporting it on the rail in raised position, including a pair of levers oppositely and outwardly extending from transverse pivots longitudinally spaced along said frame, each said lever having at the outer end thereof a rail engaging roller, means for holding said levers in frame raising position, and additional rail engaging means at the outer ends of said levers having a transverse extension greater than the length of said rail engaging rollers, said additional means being positioned to engage said rail when the rollers are out of supporting engagement with said rail.

23. In a rail drill, a frame and means for slidably supporting it on a rail for transverse sliding movement across said rail, a drill spindle rotatably mounted on said frame and held against longitudinal movement along its axis in relation to said frame, a drill bit in said spindle and means for rotating spindle and bit, guide means on said frame, a carrier member longitudinally movable along said guide means, a dog on said guide means adapted for engagement with the side of the rail web opposite the spindle, and means for bodily moving the frame and spindle in relation to said dog, and for thereby feeding the drill bit toward and through the rail, said dog including a web engaging bifurcation, the space between said bifurcation being aligned with the axis of rotation of the spindle.

HENRY H. TALBOYS.
HELMER E. ERICKSON.